United States Patent [19]
Penny

[11] 3,877,863
[45] Apr. 15, 1975

[54] APPARATUS FOR EFFECTING CONTROLLABLE VAPORIZATION OF LIQUID

[76] Inventor: Robert Noel Penny, 12 Aldenbrook Rd., Solihull, England

[22] Filed: Mar. 22, 1973

[21] Appl. No.: 343,653

[30] Foreign Application Priority Data
Mar. 22, 1972 United Kingdom............... 13299/72

[52] U.S. Cl................. 431/75; 60/39.66; 60/39.71; 60/39.72 R; 431/346
[51] Int. Cl............................................. F23n 5/02
[58] Field of Search..................... 431/346, 350, 75; 60/39.71, 39.72 R, 39.66

[56] References Cited
UNITED STATES PATENTS

| | | | |
|---|---|---|---|
| 2,617,252 | 11/1952 | Klein | 60/39.72 R |
| 2,660,859 | 12/1953 | Chamberlain | 60/39.72 R |
| 2,682,747 | 7/1954 | Ruegg | 60/39.72 R |
| 2,697,910 | 12/1954 | Brzozowski | 60/39.72 R |
| 2,775,294 | 12/1956 | Schwank | 431/346 |
| 2,859,588 | 11/1958 | Wilson | 60/39.72 R |
| 3,223,142 | 12/1965 | Harrison | 431/346 |
| 3,535,066 | 10/1970 | Wagner | 431/346 |
| 3,748,111 | 7/1973 | Klose | 431/346 |
| 3,748,853 | 7/1973 | Jones et al. | 60/39.72 R |

*Primary Examiner*—Carroll B. Dority, Jr.
*Assistant Examiner*—W. E. Tapolcai, Jr.
*Attorney, Agent, or Firm*—Hauke, Gifford, Patalidis & Dumont

[57] ABSTRACT

Flame-holding device for effecting controllable vaporization of vaporific liquid fuel in a stream of hot air or other oxidant flowing through a duct, the flame-holding device being positioned in the duct and extending transversely of the flow path therethrough of the stream of oxidant to create a region of reduced pressure in which vaporized fuel can be ignited and will burn in the stream of oxidant, the flame-holding device extending from the duct to a region at a temperature lower than that of the portion of the flame-holding device positioned in the duct, whereby heat transfer will occur along the flame-holding device from the portion thereof in the duct to the portion thereof in the colder region externally of the duct at a rate dependent upon the relative temperatures of the hotter and colder portions of the flame-holding device, the rate of heat transfer and hence the rate of vaporization of fuel in the duct being controllable by varying the temperature of the region externally of the duct into which the flame-holding device extends.

6 Claims, 5 Drawing Figures

APPARATUS FOR EFFECTING CONTROLLABLE VAPORIZATION OF LIQUID

BACKGROUND OF THE INVENTION

The invention relates to apparatus for effecting controllable vaporization of vaporific liquid fuel in a stream of hot air or other oxidant flowing through a duct and is particularly, but not exclusively, concerned with the combustion of fuel in a stream of hot air leading from a heat exchanger to a turbine of a gas turbine engine.

SUMMARY OF THE INVENTION

According to the invention, apparatus for effecting controllable vaporization of vaporific liquid fuel in a stream of hot air or other oxidant flowing through a duct comprises flame-holding means positioned in the duct and extending transversely of the flow path therethrough of the stream of oxidant, to create a region of reduced pressure in which vaporized fuel can be ignited and will burn in the stream of oxidant, the flame-holding means extending from the duct to a region at a temperature lower than that of the portion of the flame-holding means positioned in the duct, whereby heat transfer will occur along the flame-holding means from the portion thereof in the duct to the portion thereof in the colder region externally of the duct at a rate dependent upon the relative temperatures of the hotter and colder portions of the flame-holding means, the rate of heat transfer and hence the rate of vaporization of fuel in the duct being controllable by varying the temperature of the region externally of the duct into which the flame-holding means extends.

In one form of the apparatus, the flame-holding means comprises one or more elongate members each having an impervious external surface. Each elongate member is conveniently a rod or tube and where several are employed they are positioned substantially parallel with each other and spaced apart by small distances to effect restriction of flow through the duct and hence to create the region of reduced pressure downstream of the member. The heat transfer along the member or each member is conveniently effected by making the member tubular and providing a heat-conductive fluid within the member. The member fluid may be sealed within the or each member or the member or alternative each member may be open at at least one end thereof and the coolant fluid may be circulated through the member.

Alternatively, the flame-holding means may be a block of heat-conductive porous material such as a heat-conductive ceramic or ceramic-like material. With this arrangement, the fuel will burn in the stream of air or other oxidant across substantially the whole cross-section of the duct at a short distance downstream of the block. Due to the heat transfer to the portion of the block extending externally of the duct the vaporization of fuel may be controlled by varying the temperature in the region into which the external portion of the block extends.

The temperature of the region into which the external portion of the flame-holding means extends may be controlled by passing air over the external portion of the flame-holding means at a controlled temperature or at a controlled rate.

Conveniently, the duct containing the flame-holding means leads directly from a heat exchanger to a turbine of a gas turbine engine. The stream of cooling air for the external portion of the flame-holding means may be cold air flowing to the heat exchanger.

BRIEF DESCRIPTION OF THE DRAWINGS

By way of example, two embodiments of the apparatus according to the invention are now described with reference to the accompanying drawings, in which.

DESCRIPTION OF THE PREFERRED EMBODIMENT

Figure 1:
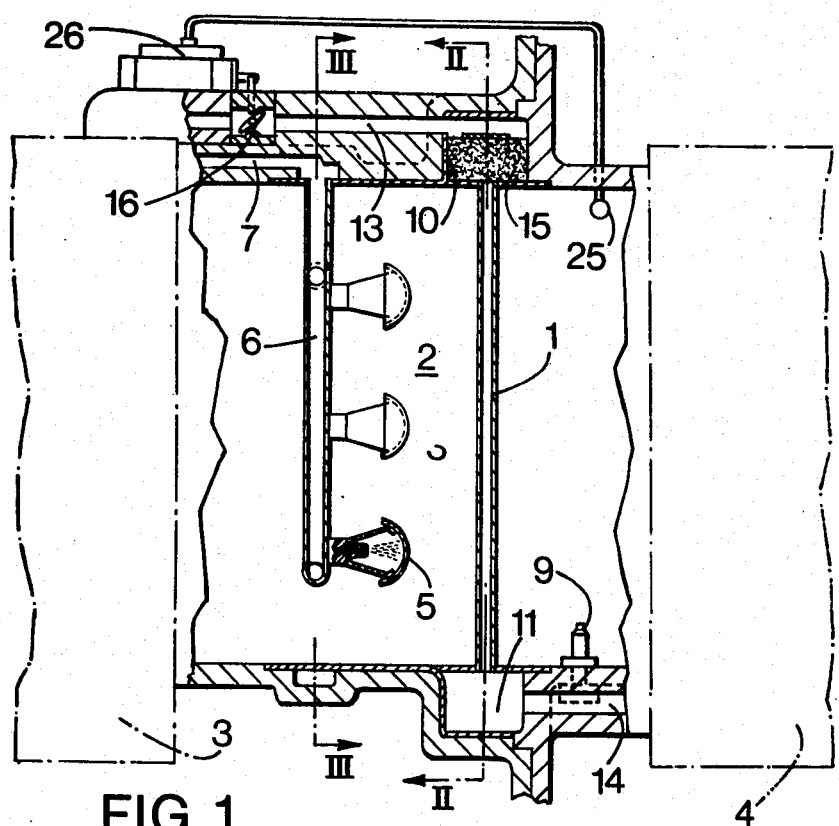
FIG. 1 is an axial section through part of a gas turbine engine incorporating the first embodiment of the apparatus.
Figure 2:
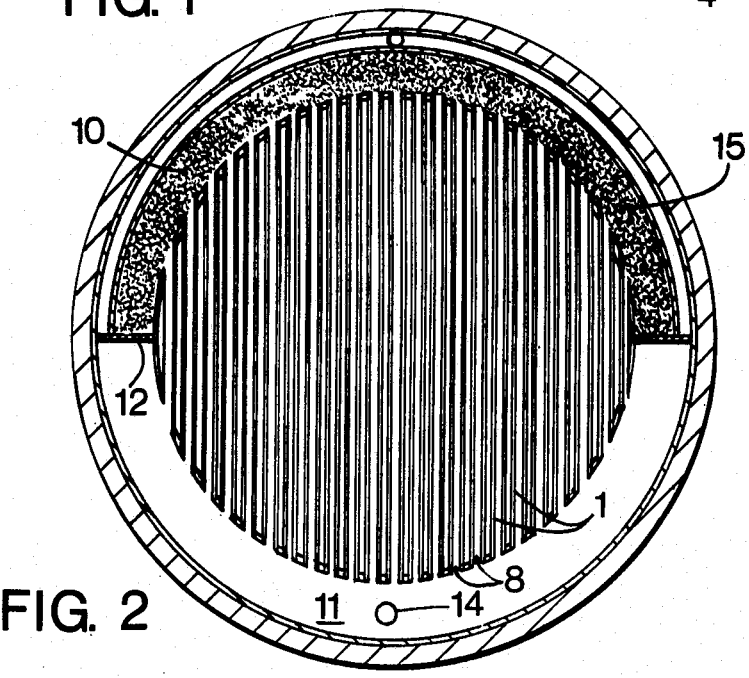
FIG. 2 is a section on the line II—II in FIG. 1.
Figure 3:
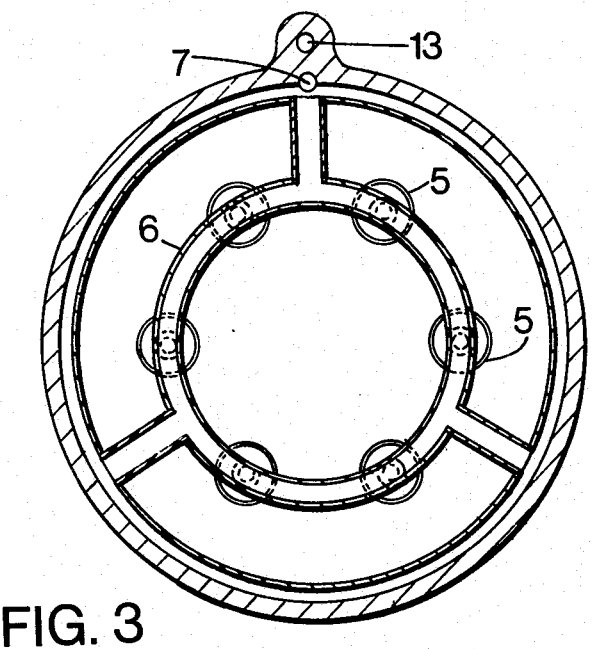
FIG. 3 is a section on the line III—III in FIG. 1.

Referring to FIGS. 1 to 3, the first embodiment of the apparatus comprises an array of parallel tubes 1 extending transversely across a duct 2 leading from a compressor 3 to a turbine 4 of the gas turbine engine, or where a heat exchanger is provided, between the heat exchanger and the turbine. A plurality of feed nozzles 5 interconnected by an annular supply pipe 6 supplied with liquid fuel under pressure from a duct 7 is positioned to discharge liquid fuel into the air stream from the compressor 3, or heat exchanger, where provided, upstream of the array of tubes 1. The tubes 1 are arranged close together to provide restricted parallel flow paths 8 therethrough for the air stream in the duct 2 and now containing fuel from the nozzles 5. The flow paths 8 between the tubes 1 produce a region of reduced pressure downstream of the array of tubes 1 in which the mixture of fuel and air is ignited by an igniter 9. The tubes 1 become heated by the combustion and thereby effect vaporization of fuel in the air stream and the array of tubes 1 forms a flame-holder, thereby enabling a region of combustion to be established downstream of the array of tubes 1 over substantially the whole area of the array, the flame beginning just downstream of the array of tubes and extending further downstream thereof.

The tubes 1 communicate at their ends with two semi-annular manifolds 10, 11 formed by dividing an annular gallery surrounding the duct 2 in the vicinity of the array of tubes 1 by a diametrical wall 12 (see FIG. 2). The manifold 10 receives cold air through a duct 13 from the compressor, that is upstream of the heat exchanger, where provided, and the manifold 11 delivers air from the tubes 1 to a duct 14 leading to a region of lower pressure adjacent the turbine 4. The manifold 10 preferably contains a sponge-like or porous filling material 15 to ensure that the air flow is so distributed circumferentially around the manifold 10 as to flow through each of the tubes 1. A control valve, such as a butterfly valve 16 is provided to control the rate of flow of air entering the manifold 10 through the duct 13 and flowing through the tubes 1.

During operation of the engine the air in the manifold 10 will be cooler than the air flowing through the tubes 1 and thus there will be a temperature gradient between the inlet ends of the tubes 1 adjacent the inlet manifold 10 and the outlet ends of the tubes 1 adjacent the outlet manifold 11. This temperature gradient is dependent on the rate of flow of air from the compressor supplied through the duct 13 and controllable by the valve 16. The controlled temperature gradient determines the rate of heat transfer from the tubes 1 to the air stream in the duct 2 and hence the rate of vaporization of fuel.

Figure 4:
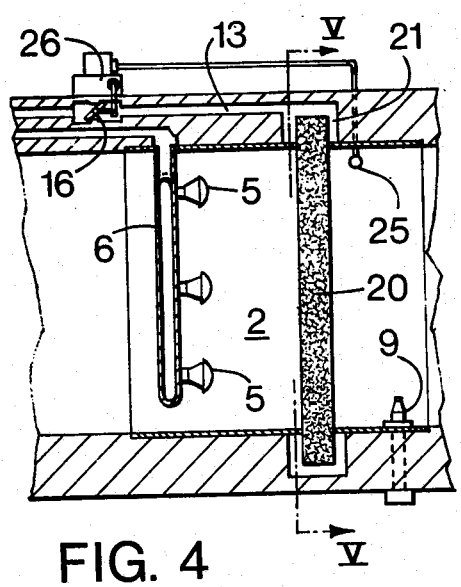
FIG. 4 is an axial section through part of a gas turbine engine incorporating the second embodiment of the apparatus.
Figure 5:
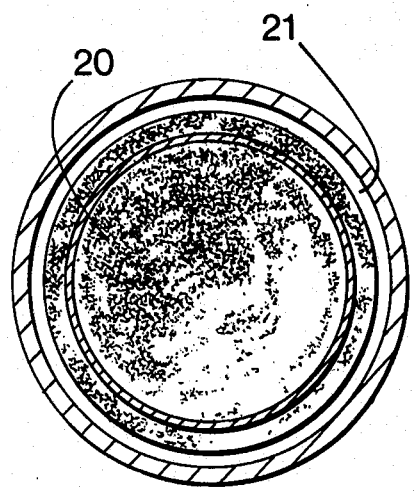
FIG. 5 is a section on the line V—V in FIG. 4.

The second embodiment shown in FIGS. 4 and 5 in which like parts have the same reference numbers as in FIGS. 1 to 3 employs a porous disc 20 in place of the array of tubes 1 of the first embodiment. The disc 20 is capable of withstanding the temperature of combustion and is conveniently of a heatconductive sponge or foam-like material, such as a metallic sponge or heat-conductive ceramic. The disc 20 is of larger diameter than the duct 2 and its periphery extends into an annular gallery 21, which in this embodiment is not divided into two manifolds. Air from the duct 13 flows around the annular gallery 21 and flows inwardly into the disc 20 and then mixes with the mixture of air and fuel and emerges from the downstream face of the disc 20 into the duct 2. Like the array of tubes 1 of the first embodiment, the disc 20 produces a region of reduced pressure downstream thereof and acts as a flame holder, the flame beginning just downstream of the downstream face of the disc and extending further downstream of the disc. As the peripheral portion of the disc 20 is held at a lower temperature than the portion of the disc within the duct 2, there is a temperature gradient radially of the disc 20. This is controlled by the rate of flow of cold air entering the gallery 21 through the duct 13 by the valve 16. Thus the rate of vaporization of fuel by the disc 20 is controlled by the valve 16. The pores of the disc 20 are such that flow of air and fuel through the disc 20 in the axial direction of the duct 2 and also radially inward and then substantially axial flow of air from the gallery 21 are permitted simultaneously.

In each embodiment the valve 16 controlling the rate of flow of air through the duct 13 may be operated in response to temperature in the duct 2 at a position downstream of the array of tubes 1 or the disc 20. A temperature-sensitive probe 25 and control means 26 for the valve 16 are illustrated diagrammatically in FIGS. 1 and 4.

Instead of using tubes 1 in FIGS. 1 to 3, closely spaced parallel rods may be employed. In that case as there is no flow of cold air between the manifolds 10 and 11, the annular gallery into which the radially-outer ends of the rods extend need not be divided by the wall 12 to form two separate manifolds. Thus the annular gallery would be like the gallery 21 in FIG. 4. Air would be circulated through the gallery by providing an outlet duct therefrom leading to a region of the duct 2 adjacent the turbine 4. An arrangement similar to the array of rods may be attained by using sealed tubes or hollow rods containing a heat-conductive fluid in place of the rods, the heat transfer being effected by convection flow of the coolant within each tube or hollow rod.

Although an array of parallel tubes or rods is described herein, a single tube or rod or other arrangement of tubes or rods may be provided to effect the desired control of vaporization of fuel combined, where necessary, with other flame-holding means.

Where the apparatus of either embodiment is employed in a gas turbine engine having a heat exchanger, the main stream of air in the duct 2 would be delivered into the duct after having been heated in the heat exchanger and the air flowing through the duct 13 would be supplied directly by the compressor and would therefore be cooler than that flowing through the duct 2.

In either of the preceding embodiments, the controlling of the rate of vaporisation of fuel by the flame-holding means affords the following advantages:

1. An alternative way of controlling the heat produced in a combustion chamber without altering the rate of introduction of fuel into the combustion chamber, for example through the nozzles 5, is provided.

2. An additional way in which the heat produced can be controlled by some parameter other than that which varies the rate of introduction of fuel into the combustion chamber, for example through the nozzles 5, is provided.

3. Substantially uniform heat release and as complete combustion as possible is provided throughout the cross-sectional area of the combustion chamber, this being difficult to ensure when using only the separate fuel nozzles 5 which without the flame-holding means would tend to produce streaks of hot gases spaced apart in the cross-sectional area of the combustion chamber. By providing such uniform heat release over the whole cross-section of the combustion chamber, the combustion will tend to be more complete throughout the cross-sectional area of the combustion chamber and this will lead to a higher specific power output and increase the reliable working life of the engine.

What I claim as my invention and desire to secure by Letters Patent of the United States is:

1. Apparatus for effecting controllable vaporization of vaporific liquid fuel in a stream of hot air or other oxidant flowing through a duct comprising flameholding means positioned in the duct and extending transversely of the flow path therethrough of the stream of oxidant to create a region of reduced pressure in which vaporized fuel can be ignited and will burn in the stream of oxidant, means defining a region externally of said duct, the flame-holding means comprising a heat exchanger communicating with said external region, means for passing a stream of air through said external region at a temperature lower than said heat exchanger positioned in the duct, whereby heat transfer will occur along the flame-holding means to said external region at a rate dependent upon the temperature sensed downstream of said heat exchanger by a temperature sensor and valve means controlled by said temperature sensor to vary the rate of flow of air through said external region and hence the rate of heat transfer and the rate of vaporization of fuel in the duct, the apparatus also including means for introducing liquid fuel into the region of reduced pressure and ignition means positioned downstream of said flameholding means.

2. Apparatus as claimed in claim 1 in which the flame-holding means comprises at least one elongate member having an impervious external surface.

3. Apparatus as claimed in claim 2 in which there is a plurality of elongate members extending substantially parallel with each other and spaced apart by small distances to effect restriction of flow through the duct.

4. Apparatus as claimed in claim 3 in which each elongate member is hollow and a quantity of coolant fluid is sealed therewithin, whereby heat transfer is effected by convection flow of coolant within each member.

5. Apparatus as claimed in claim 1 in which the flame-holding means is a block of heat-conductive porous material.

6. Apparatus for effecting controllable vaporization of vaporific liquid fuel in a stream of hot air or other oxidant flowing through a duct comprising flame-holding means positioned in the duct and extending transversely to the flow-path therethrough of the stream of oxidant to create a region of reduced pressure in which vaporized fuel can be ignited and will burn in the stream of oxidant, the flame-holding means comprising a plurality of elongate tubular members each having means by which coolant fluid is passed through said tubular members, the tubular members extending substantially parallel to each other and spaced apart by small distances to effect restriction of flow through the duct, means regulating the supply of coolant fluid through said tubular members in response to the temperature sensed downstream of said flameholder, the apparatus also including means for introducing liquid fuel into the region of reduced pressure and ignition means positioned downstream of the flameholding means.

* * * * *

UNITED STATES PATENT OFFICE
CERTIFICATE OF CORRECTION

PATENT NO. : 3,877,863
DATED : April 15, 1975
INVENTOR(S) : Robert N. Penny

It is certified that error appears in the above-identified patent and that said Letters Patent are hereby corrected as shown below:

In the Title, After "Liquid" insert --Fuel-- line 48, after "the" (first instance) insert --member--
lines 48 and 49, delete "member or";
line 49, after "alternative" insert --the member or--.

Col. 2, line 30, delete "is" and insert --are--

Col. 3, line 37, delete "radiallyinward" and insert --radially-inward--.

Signed and Sealed this

*twenty-second* Day of *July 1975*

[SEAL]

Attest:

RUTH C. MASON
*Attesting Officer*

C. MARSHALL DANN
*Commissioner of Patents and Trademarks*